(12) United States Patent
Belloni

(10) Patent No.: US 11,578,727 B2
(45) Date of Patent: Feb. 14, 2023

(54) METHODS AND SYSTEM FOR CONTROL OF COMPRESSORS WITH BOTH VARIABLE SPEED AND GUIDE VANES POSITION

(71) Applicant: Compressor Controls Corporation, Des Moines, IA (US)

(72) Inventor: Stefano Belloni, Waukee, IA (US)

(73) Assignee: Compressor Controls LLC, Des Moines, IA (US)

( * ) Notice: Subject to any disclaimer, the term of this patent is extended or adjusted under 35 U.S.C. 154(b) by 0 days.

(21) Appl. No.: 17/468,904

(22) Filed: Sep. 8, 2021

(65) Prior Publication Data

US 2022/0082107 A1 Mar. 17, 2022

Related U.S. Application Data

(60) Provisional application No. 63/079,607, filed on Sep. 17, 2020.

(51) Int. Cl.
*F04D 27/02* (2006.01)
*F04D 27/00* (2006.01)
*F04D 19/00* (2006.01)

(52) U.S. Cl.
CPC ......... *F04D 27/002* (2013.01); *F04D 19/002* (2013.01); *F04D 27/0246* (2013.01); *F04D 27/0261* (2013.01)

(58) Field of Classification Search
CPC .. F04D 27/002; F04D 19/002; F04D 27/0246; F04D 27/0261; F04D 27/001; F04D 27/0207; F04D 25/04; Y02B 30/70
See application file for complete search history.

(56) References Cited

U.S. PATENT DOCUMENTS

| | | | |
|---|---|---|---|
| 4,646,534 | A | 3/1987 | Russell |
| 4,949,276 | A | 8/1990 | Staroselsky et al. |
| 5,798,941 | A | 8/1998 | McLeister |
| 6,941,217 | B1 | 9/2005 | Munson, Jr. |
| 7,104,076 | B2 | 9/2006 | Scarcella et al. |

(Continued)

FOREIGN PATENT DOCUMENTS

| | | |
|---|---|---|
| CN | 202048014 U | 11/2011 |
| CN | 104696078 B | 2/2019 |

(Continued)

*Primary Examiner* — Aaron R Eastman
(74) *Attorney, Agent, or Firm* — Snyder, Clark, Lesch & Chung, LLP

(57) ABSTRACT

A control system is provided to optimize a compressor that has a variable guide vane position and a variable speed set point. One or more controllers receive a process set point for a main process variable for a first performance control application and a deviation set point for a surge deviation level for a second performance control application. The first performance control application operates a first independent primary control loop to control the main process variable at the process set point by manipulating the variable guide vane position. The second performance control application operates a second independent primary control loop to control a surge deviation level at the deviation set point by manipulating the variable speed set point. The second performance control application also executes a limit control loop to limit the main process variable at a limit set point by manipulating the variable speed set point.

20 Claims, 10 Drawing Sheets

(56) References Cited

U.S. PATENT DOCUMENTS

| | | |
|---|---|---|
| 8,278,864 B2 | 10/2012 | Powell |
| 9,574,805 B2 | 2/2017 | Yang et al. |
| 10,337,672 B2 | 7/2019 | Calvin et al. |
| 2015/0086326 A1 | 3/2015 | Husted et al. |
| 2018/0142579 A1 | 5/2018 | Camprini et al. |

FOREIGN PATENT DOCUMENTS

| | | |
|---|---|---|
| CN | 109488462 A | 3/2019 |
| EP | 0443384 A2 | 2/1990 |
| EP | 0932091 A2 | 7/1999 |

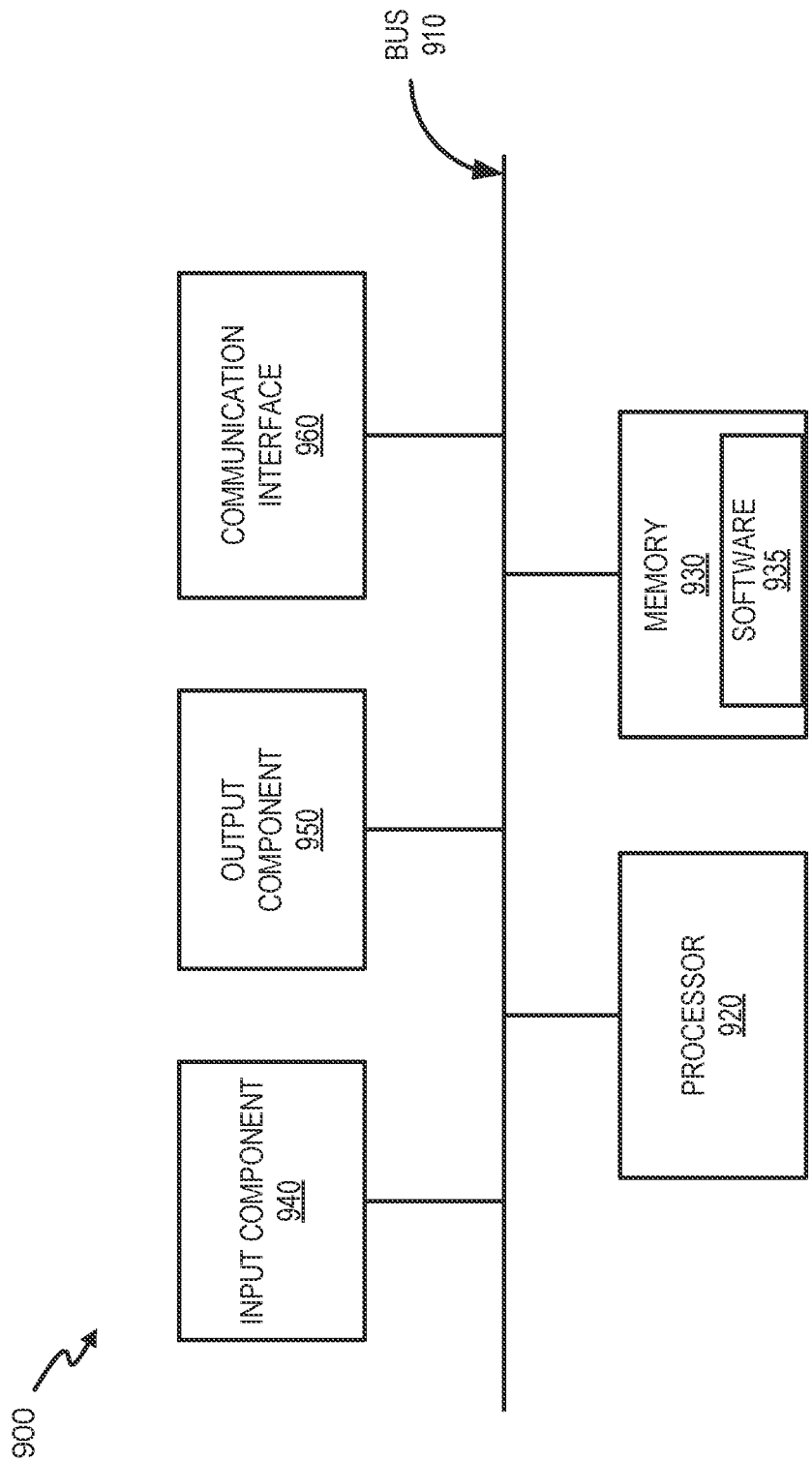

METHODS AND SYSTEM FOR CONTROL OF COMPRESSORS WITH BOTH VARIABLE SPEED AND GUIDE VANES POSITION

CROSS-REFERENCE TO RELATED APPLICATION

This application claims priority under 35 U.S.C. § 119, based on U.S. Provisional Patent Application No. 63/079,607 filed Sep. 17, 2020, titled "Methods and System for Control of Compressors with Both Variable Speed and Guide Vanes Position," the disclosure of which is hereby incorporated by reference.

BACKGROUND OF THE INVENTION

Compressors with variable speed and variable guide vane positions are sometimes engineered by compressor manufacturers and operated by end users. For some machines, a compressor's original equipment manufacturer (OEM) allows changes in the compressor's performance by acting on both of two control elements. The presence of two control elements allows for multidimensional control of the machine performance and presents challenges and opportunities for the design of optimal control algorithms.

BRIEF DESCRIPTION OF THE DRAWINGS

FIG. 9 is a diagram illustrating exemplary physical components of a controller of FIG. 1.

DETAILED DESCRIPTION OF THE PREFERRED EMBODIMENTS

Figure 1:
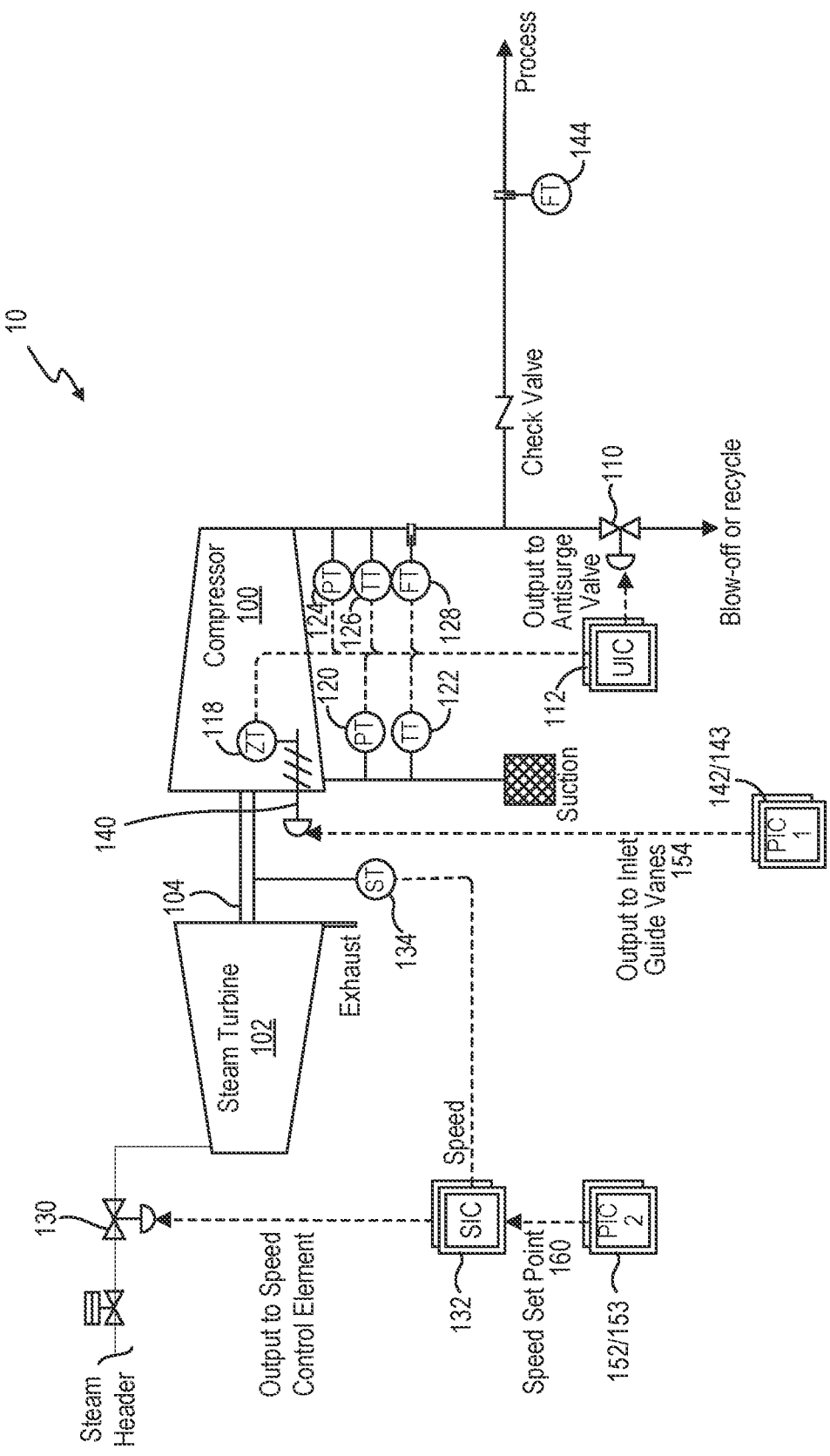
FIG. 1 is a schematic of an exemplary system in which systems and methods described herein may be implemented.

The following detailed description refers to the accompanying drawings. The same reference numbers in different drawings may identify the same or similar elements. The following detailed description does not limit the invention.

Systems and methods described herein relate generally to an automatic control scheme for compressors with variable speed and variable guide vane (e.g., inlet guide vane (IGV)) positions. More particularly, implementations described herein relate to methods and systems for optimizing compressor performance by simultaneously controlling both the speed set point and guide IGV position by two independent control loops.

Conventional control systems have been designed to control compressor speed and guide vane position in a split range, with one control element used up to a certain threshold, after which the second control element is used. Traditional split range control approaches limit the performance of these compressors and may result in operating at lower efficiency than achievable with the proposed method. The use of split-range control does not allow the systems to control the compressor at the complete operating envelope of the compressor, eventually not meeting the process demand, and causing the compressor to operate in a less-efficient operating range with higher power consumption.

According to implementations described herein, two independent control loops, one controlling the speed and another one controlling the guide vane position, may be used to optimize turbocompressor performance. In one control scheme, a main process control variable may be primarily controlled by inlet guide vane position. In another control scheme, the main process control variable may be primarily controlled by a speed set point. At the same time, whichever control loop is not acting on the main process control variable may operate to control compressor deviation from a surge control line calculated by a companion antisurge controller.

Using a process control variable primarily controlled by inlet guide vanes, a first performance control application acts on inlet guide vanes position command with a primary control proportional-integral-derivative (PID) loop controlling the main process variable at a process set point. A second performance control application acts on a speed set point command with (a) the primary control PID loop controlling the deviation calculated by a companion antisurge control loop at a deviation set point, and (b) a limit control PID loop controlling the main process variable at a limit set point, which is calculated at the primary set point for the other control application plus/minus a bias.

Using a process control variable primarily controlled by speed set point, a first performance control application acts on speed set point, with a primary control PID loop controlling the main process variable at process set point. A second performance control application acts on an inlet guide vanes position command, with (a) the primary control PID loop controlling the deviation calculated by the companion antisurge control loop at the deviation set point, and (b) a limit control PID loop controlling the main process variable at a limit set point, which is calculated at the primary set point for the other control application plus/minus a bias.

FIG. 1 is a schematic of a turbocompressor system 10 in which systems and methods described herein may be implemented. As shown in FIG. 1, system 10 includes a compressor section 100 (also referred to herein as turbocompressor 100) and a steam turbine section 102. The turbine section 102 is coupled to compressor section 100 via a rotor (e.g., shaft) 104. Rotor 104 may further be coupled to a load (not shown) which may be an electrical generator and/or a mechanical drive application, for example. As used herein, the term "couple" is not limited to a direct mechanical, electrical, and/or communication connection between components, but may also include an indirect mechanical, electrical, and/or communication connection between multiple components.

Compressor 100 may be connected to an antisurge valve 110 including an actuator. Based on compressor operating conditions, an antisurge controller 112 may set a valve position for antisurge valve 110, by sending a signal to the antisurge valve 110 actuator. Operating conditions of compressor 100 may be monitored by various sensors, such as pressure sensors, flow sensors, temperature sensors, and/or, speed sensors (not shown) the data from which is transmitted to antisurge controller 112. For example, a suction pressure transmitter 120 collects and transmits data from a suction pressure sensor; a suction temperature transmitter 122 collects and transmits data from a suction temperature sensor; a discharge pressure transmitter 124 collects and transmits data from a discharge pressure sensor; a discharge temperature transmitter 126 collects and transmits data from a discharge temperature sensor; and a flow transmitter 128 collects and transmits data from a discharge flow sensor.

Antisurge controller 112 may receive data from inlet guide vane position feedback transmitter 118, suction pressure transmitter 120, suction temperature transmitter 122, discharge pressure transmitter 124, discharge temperature transmitter 126, and/or flow transmitter 128 to regulate antisurge valve 110. Antisurge controller 112 may analyze signals from inlet guide vane position feedback transmitter 118, suction pressure transmitter 120, suction temperature transmitter 122, discharge pressure transmitter 124, discharge temperature transmitter 126, flow transmitter 128, and/or other sensor signals to calculate deviation from a surge control line and a control loop response to provide, for example, a corresponding position for antisurge valve 110.

Turbine 102 may be connected to a speed control valve 130 including an actuator. Based on turbine 102 operating conditions, a speed valve controller 132 may set a valve position for speed control valve 130 by sending a signal to the speed control valve 130 actuator. Operating conditions of turbine 102 may be monitored, for example, by a speed sensor (not shown), which reports speed data to speed valve controller 132 via a speed transmitter 134.

Speed controller 132 may receive speed data from speed transmitter 134 and analyze the speed data to calculate a control loop response to provide, control output for steam control valve 130. For example, based on a given speed set point, speed controller 132 may set a rotor speed (or turbine speed) for rotor 104, by sending a signal to the steam valve 130 actuator.

Compressor 100 may be configured with adjustable inlet guide vanes 140 including an actuator. Based on selected process variables, a process controller 142 may set a guide vane position for inlet guide vanes 140, by sending a signal to the inlet guide vane 140 actuator. Process variables of compressor 100 may be monitored by various sensors, such as pressure sensors, flow sensors, temperature sensors, speed sensors, etc. (not shown). In the example, of FIG. 1, the process variable may be a flow rate, and a flow transmitter 144 may provide flow rate data to process controller 142 and a process controller 152.

Antisurge valve 110, suction pressure transmitter 120, suction temperature transmitter 122, discharge pressure transmitter 124, discharge temperature transmitter 126, flow transmitter 128, speed control valve 130, speed transmitter 134, and inlet guide vanes 140 along with their respective sensors and/or actuators may be referred to herein collectively and/or generically as "field devices."

Process controller 142 may receive data from flow or pressure transmitter 144 (or another field device that provides a different process variable) to regulate the position of inlet guide vanes 140. As described further herein, process controller 142 may analyze signals from flow transmitter 144, antisurge controller 112, and/or other sensor signals to calculate a control loop response to, for example, a corresponding position for inlet guide vanes 140. Process controller 142 may include a performance control application acting on an inlet guide vanes position command 154 that is provided to inlet vane guides 140.

Process controller 152 may receive data from flow transmitter or pressure 144 to regulate a speed set point, which may be provided to and implemented by speed valve controller 132. As described further herein, process controller 152 may analyze signals from flow or pressure transmitter 144, antisurge controller 112, and/or other sensor signals to calculate a control loop response to, for example, a corresponding speed set point for speed controller 132. Process controller 152 may include a performance control application acting on speed set point command 160 that process controller 152 provides to speed valve controller 132.

Figure 2A:
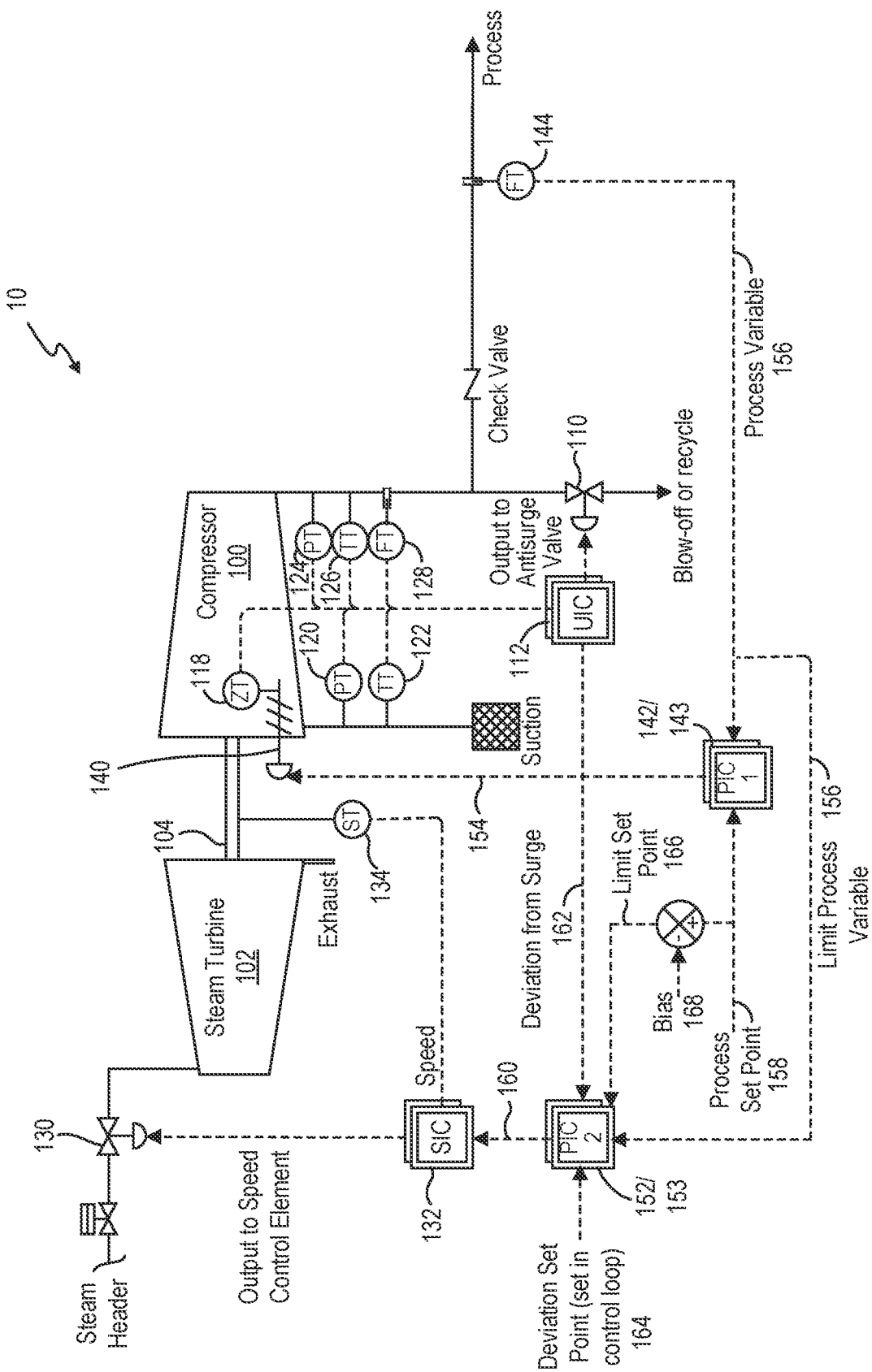
FIG. 2A is a schematic of the system of FIG. 1 implementing independent simultaneous control loops with a primary control variable controlled by inlet guide vanes (IGV)
Figure 2B:
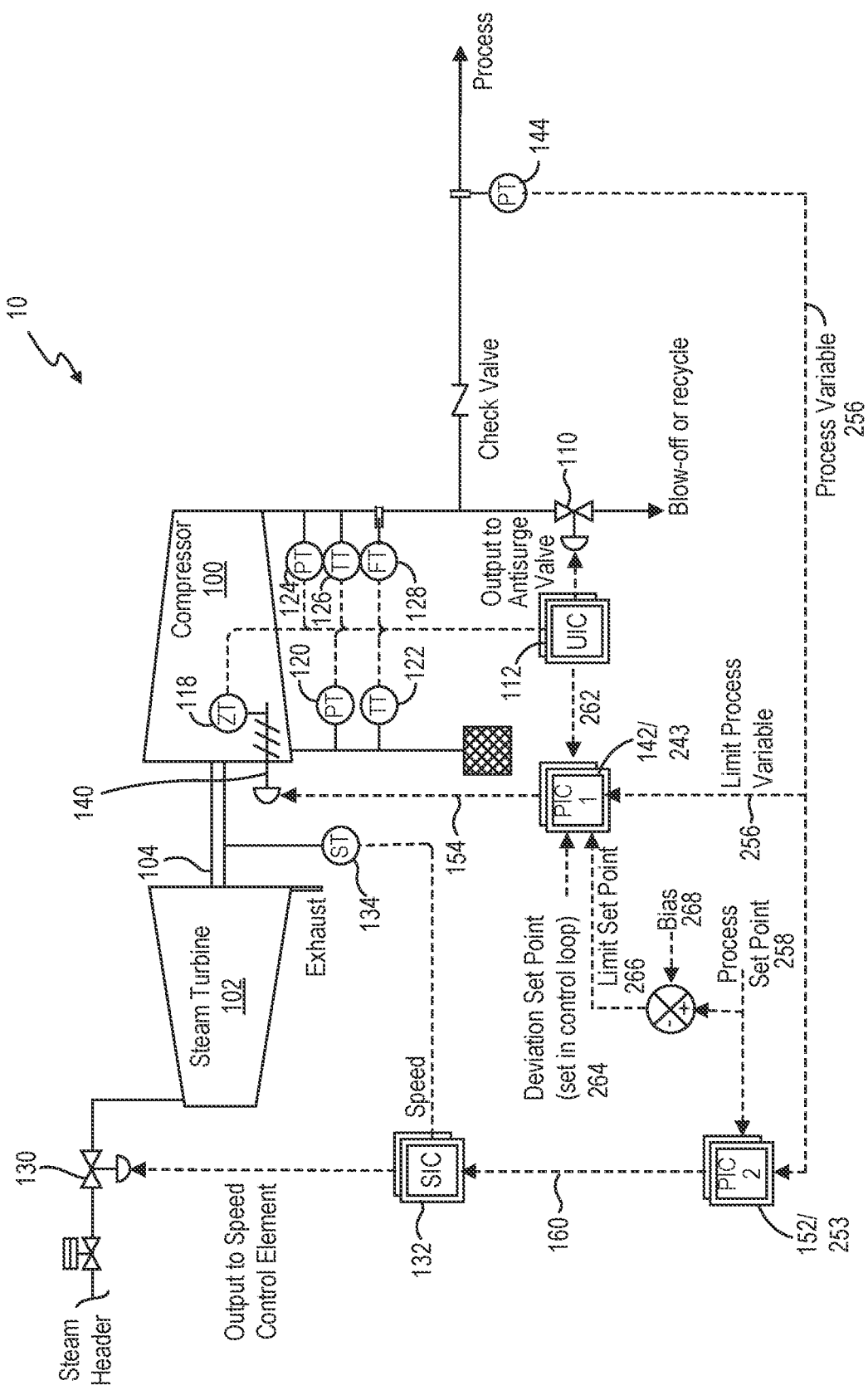
FIG. 2B is a schematic of the system of FIG. 1 implementing independent control loops with a primary control variable controlled by shaft speed.

FIGS. 2A and 2B illustrate different configurations of system 10 for optimizing compressor performance by simultaneously controlling both the speed set point and IGV position by two independent control loops. In the configuration of FIG. 2A, independent control loops are used to simultaneously control the speed set point and guide vane position for system 10, with the process control variable—discharge flow in this example—principally controlled by the position of inlet guide vanes 140.

One of the independent control loops is a PID loop managed by process controller 142 (e.g., using a performance control application 143). Performance control application 143 controls the main process variable 156 (e.g., from flow transmitter 144) at a process set point 158 that is provided to guide vane controller 142.

Another of the independent control loops is a PID loop managed by process controller 152 (e.g., using a performance control application 153) and controls the deviation 162 calculated by antisurge controller 112 at a deviation set point 164. Performance control application 153 may also operate a limit control PID loop controlling the main process variable 156 at a limit set point 166, which is calculated at the primary process set point 158 for the other control application 143 plus/minus a bias 168. The bias 168 may be, for example, a configured value differentiating a working value from an operating limit. Thus, performance control application 153 may adjust the variable compressor speed to help control the main process variable 156 (e.g., flow) if performance control application 143 cannot maintain main process variable 156 within designated limits, such as during transient periods of IGV position.

In the configuration of FIG. 2B, independent control loops are used to simultaneously control the speed set point and guide vane position for system 10, with the process control variable—discharge pressure in this example—principally controlled by the position of speed control valve 130. Similar to FIG. 2A, in FIG. 2B, process controller 152 may include a performance control application 253 acting on speed set point command 160 that process controller 152 provides to speed valve controller 132. In FIG. 2B, the primary control PID loop managed by process controller 152 controls the main process variable 256 (e.g., from pressure transmitter 144) at a process set point 258 that is provided to process controller 152.

Process controller 142 may include a performance control application 243 acting on an inlet guide vanes position command 254 that is provided to inlet vane guides 140. The primary control PID loop is managed by process controller 142 and controls the deviation 262 calculated by antisurge controller 112 at a deviation set point 264. Performance control application 243 may also include a limit control PID loop controlling the main process variable 256 at a limit set point 266, which is calculated at the primary process set point 258 for the other control application 253 plus/minus a bias 268. Thus, performance control application 243 may use the compressor inlet guide vanes position to help control the main process variable 256 (e.g., pressure) if performance control application 253 cannot maintain main process variable 256 within designated limits, such as during transient periods of compressor speeds.

Figure 3:
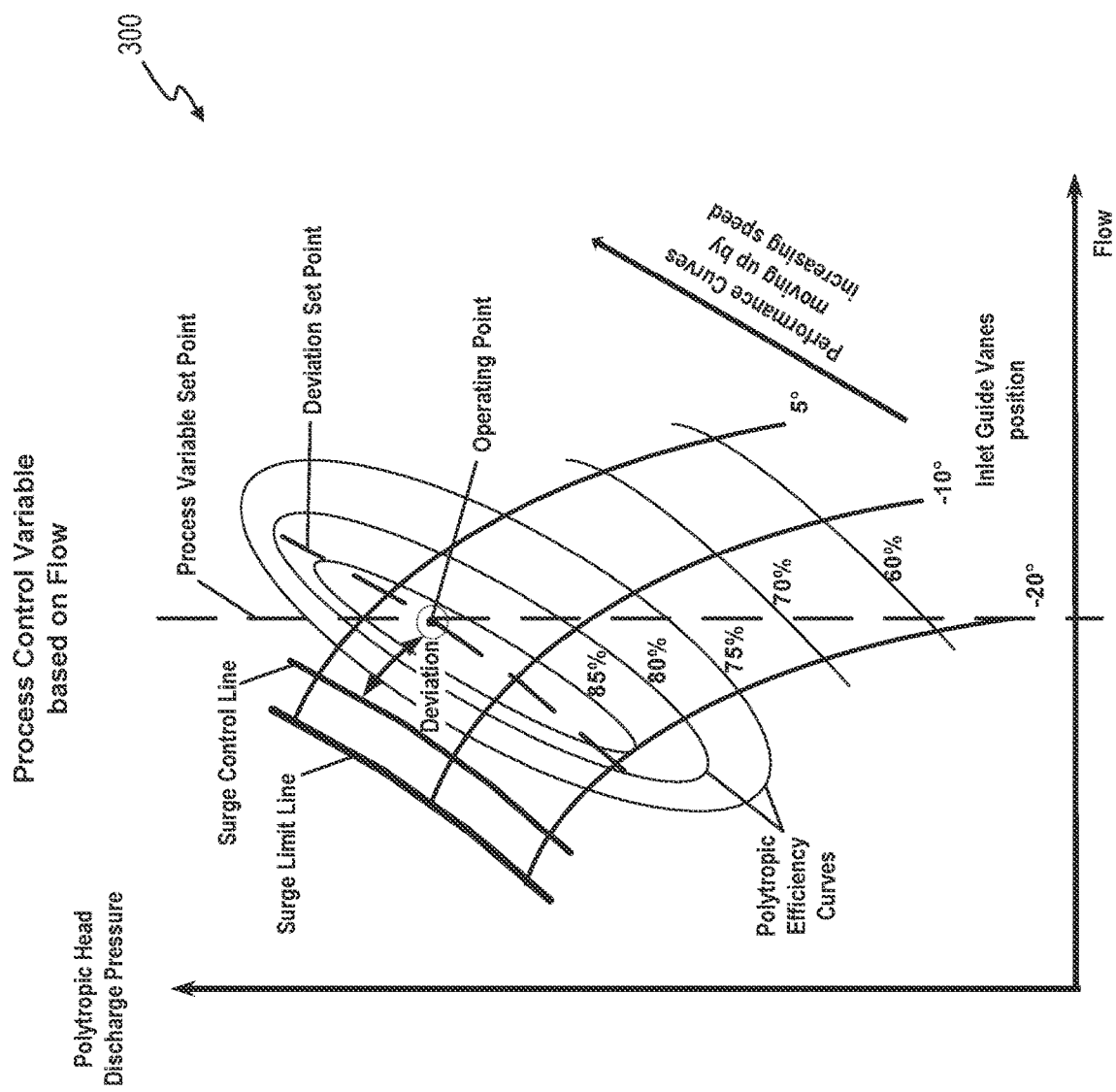
FIG. 3 is a performance curve chart illustrating performance curves of a compressor for different guide vane openings with a flow-based process variable set point.

FIG. 3 is an example of a performance curve chart 300 that shows performance curves of compressor 100 for different guide vane openings. In the example of FIG. 3, performance curves for three IGV positions (e.g., −20 deg., −10 deg., and 5 deg.) are shown. The performance curves may be valid, for example, at constant speed, suction pressure, suction temperature, suction compressibility, etc., such as the example conditions of Table 1.

TABLE 1

| Compressor Conditions | |
|---|---|
| Speed (rpm) | 5000 |
| Suction Pressure (bar) | 1.01 |
| Suction Temperature (° C.) | 25.5 |
| Suction Compressibility | 1.00 |
| Molecular Weight | 18.02 |
| Ratio of Specific Heat | 1.4 |

A process variable set point (e.g., corresponding to process set point 158) may be provided for process controller 142 as a primary input for a first control loop. In the example of FIG. 3, the process variable set point may be a particular discharge flow rate. A deviation set point (e.g., corresponding to deviation set point 164) may be provided for process controller 152 as a primary input for a second control loop. As indicated in FIG. 3, the performance curves (e.g., −20 deg., −10 deg., and 5 deg.) may move up (e.g., generally in the direction indicated in FIG. 3) as compressor speed increases. Dual control loops managed by process controllers 142 and 152, such as illustrated in the configuration of FIG. 2A, maintain the operating point of compressor 100 at the intersection of the process variable set point (e.g., for discharge flow rate) and the deviation set point line within the highest efficiency curve (e.g., 90%, 95%, etc.).

Figure 4:
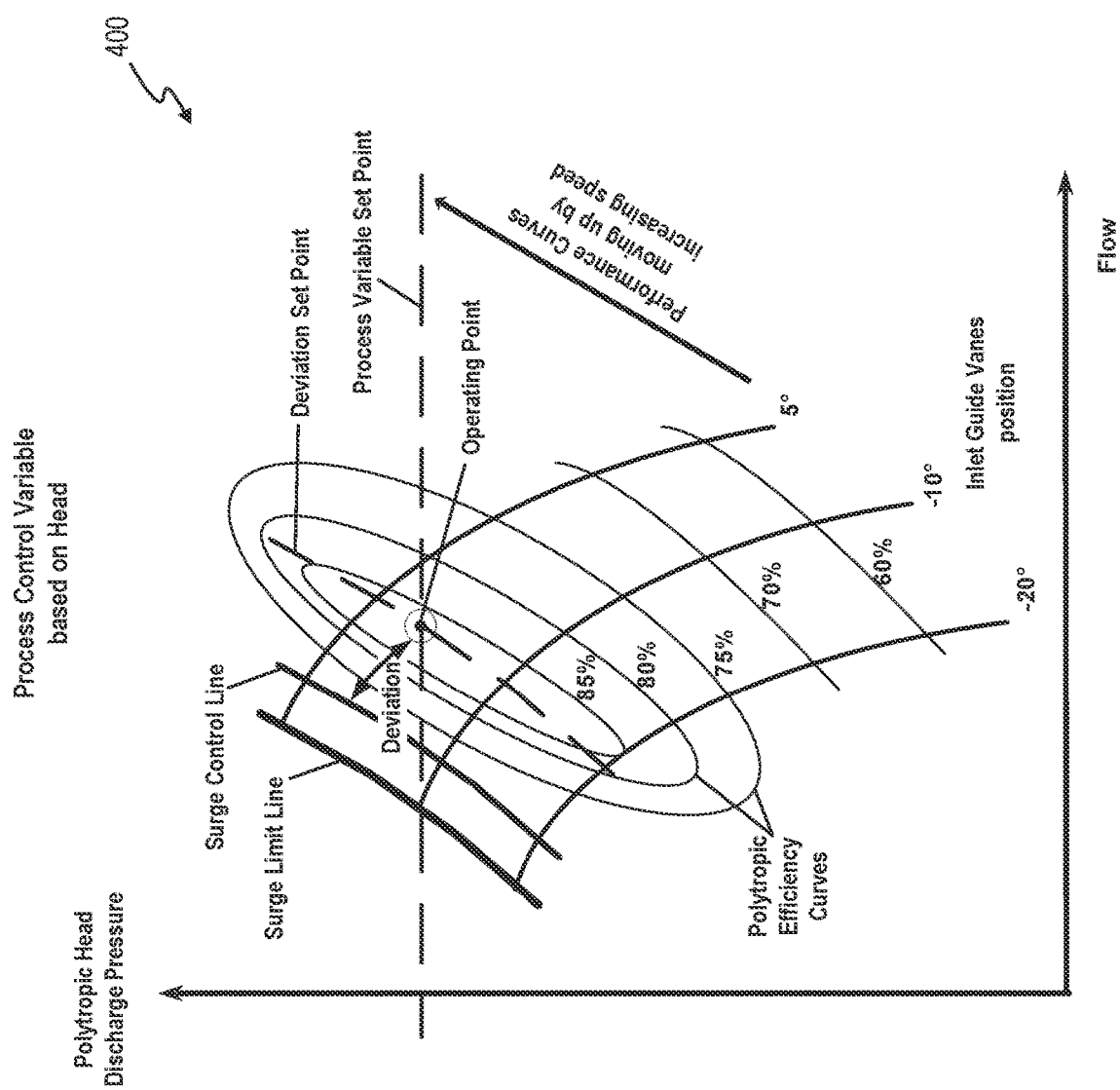
FIG. 4 is a performance curve chart illustrating performance curves of a compressor for different guide vane openings with a pressure-based process variable set point.

FIG. 4 is an example of a performance curve chart 400 that shows performance curves of compressor 100 for different guide vane openings. Similar to FIG. 3, in the example of FIG. 4, performance curves for three IGV positions (e.g., −20 deg., −10 deg., and 5 deg.) are shown under a set of consistent conditions, such as the example conditions of Table 1 above. A process variable set point (e.g., corresponding to process set point 158) may be provided for process controller 142 as a primary input for a first control loop. In the example of FIG. 4, the process variable set point may be a particular head discharge pressure. A deviation set point (e.g., corresponding to deviation set point 164) may be provided for process controller 152 as a primary input for a second control loop. As indicated in FIG. 4, the performance curves (e.g., −20 deg., −10 deg., and 5 deg.) may move up (e.g., generally in the direction indicated in FIG. 4) as compressor speed increases. Dual control loops managed by process controllers 142 and 152, such as illustrated in the configuration of FIG. 2A, maintain the operating point of compressor 100 at the intersection of the process variable set point (e.g., for head discharge pressure) and the deviation set point line within the highest efficiency curve.

Figure 5:
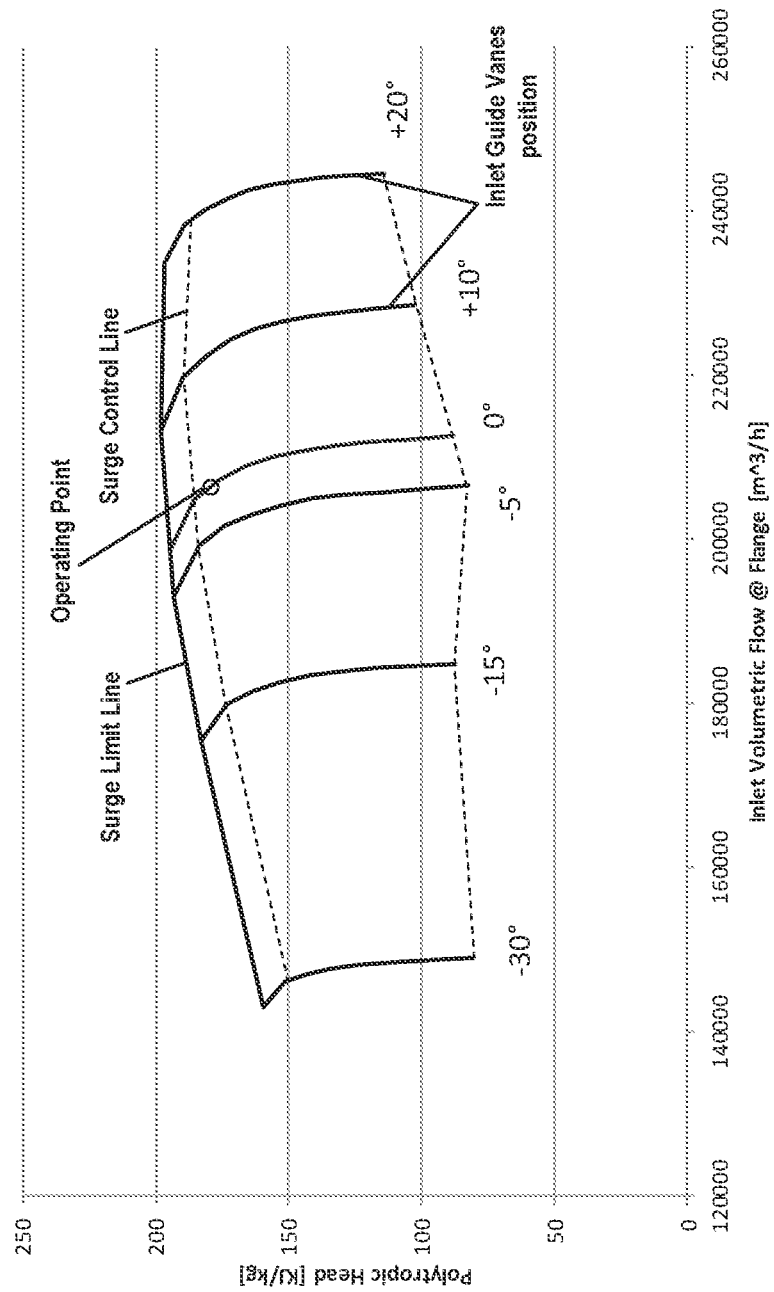
FIGS. 5 and 6 are representative compressor maps showing performance curves of different guide vane openings at different compressor speeds.
Figure 6:
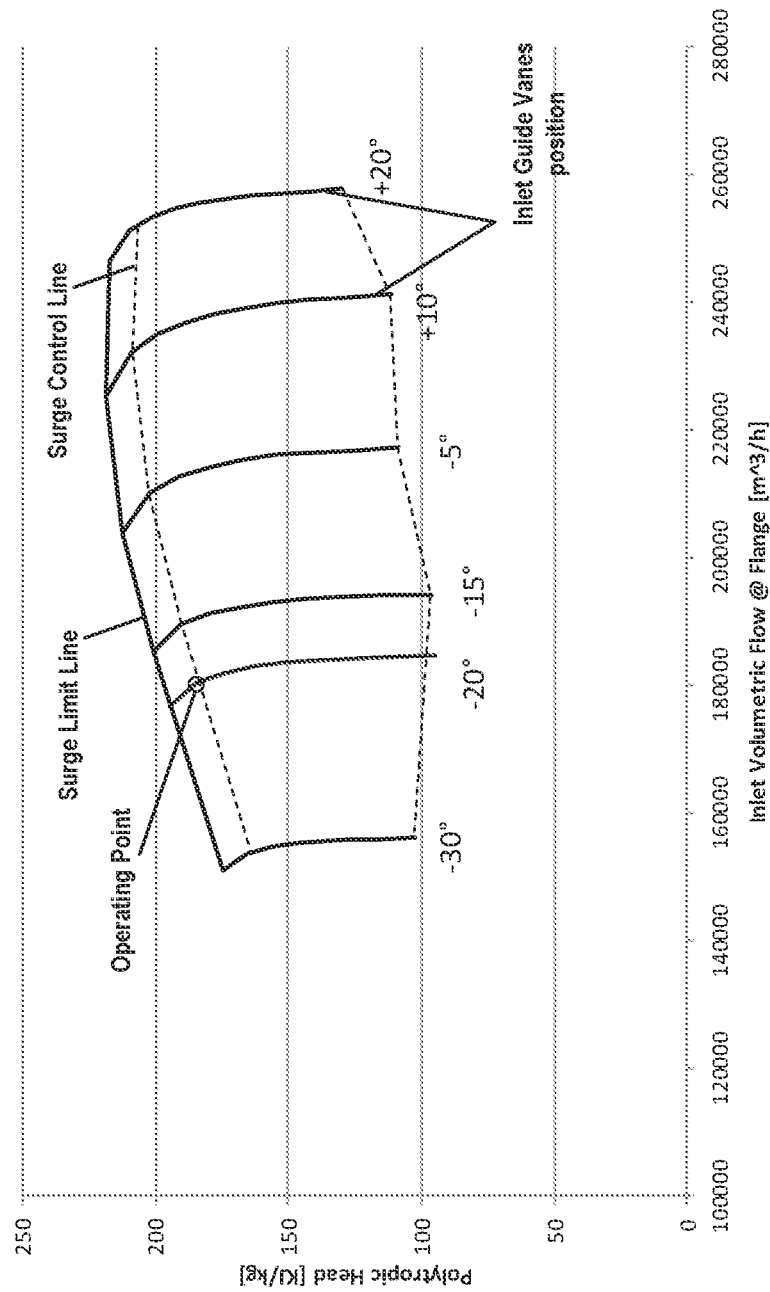

FIGS. 5 and 6 are examples of a performance curves for different inlet guide vane angles. Particularly, FIGS. 5 and 6 illustrate how changes in the compressor speed shifts the performance curve for the different inlet guide vane angles. In FIGS. 5 and 6, assume a process set point is 205000 cubic meters/hour. The performance curves of FIGS. 5 and 6 may be valid, for example, at a consistent suction pressure, suction temperature, suction compressibility, etc. FIG. 5 may be valid for the example conditions of Table 1 above. In FIG. 5, the operating point is achieved using a 0 degree IGV position operating point for a given shaft speed. Assume in FIG. 6, the compressor has the same operating conditions used in FIG. 5 (e.g., suction pressure, temperature, compressibility, etc.), but with a 5% increase in compressor speed, such as the example conditions of Table 2.

TABLE 2

| Compressor Conditions | |
|---|---|
| Speed (rpm) | 5200 |
| Suction Pressure (bar) | 1.01 |
| Suction Temperature (° C.) | 25.5 |
| Suction Compressibility | 1.00 |
| Molecular Weight | 18.02 |
| Ratio of Specific Heat | 1.4 |

Thus, in FIG. 6, the performance curves shift up, relative to those of FIG. 5. The operating point in FIG. 6 (e.g., 205000 cubic meters/hour) is achieved using a −20 degree IGV position operating point for the new shaft speed.

Figure 7:
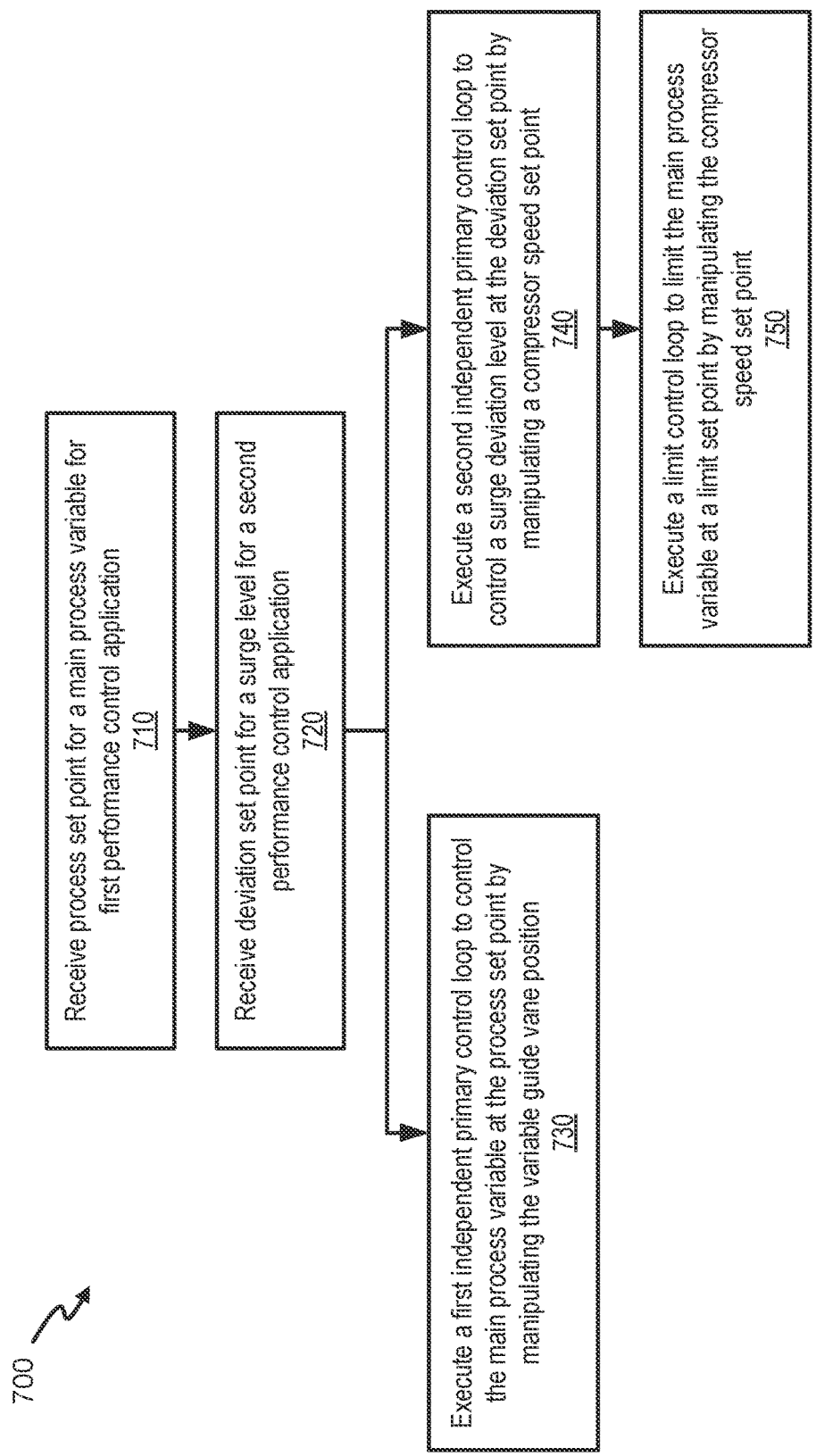
FIG. 7 is a process flow diagram for dynamically controlling both the speed set point and guide vane position to optimize operating conditions of a compressor, according to an implementation with the primary control variable controlled by IGVs.

FIG. 7 is a flow diagram of a process 700 for dynamically controlling both the speed set point and guide vane position to optimize operating conditions of a compressor. According to one implementation, process 700 may be performed by performance control applications executed on process controllers 142 and process controllers 152. In another implementation, process 700 may be performed by one or more process controllers in conjunction with antisurge controller 112, speed valve controller 132, and field devices.

As shown in FIG. 7, process 700 may include receiving a process set point for a main process variable for first performance control application (block 710), and receiving a deviation set point for a surge level for a second performance control application (block 720). For example, according to the implementation of FIG. 2A, process controller 142 and/or performance control application 143 may receive a configuration setting (e.g., user input) with process set point 158 for a main process variable, such as an inlet flow rate or discharge pressure. Similarly, process controller 152 and/or performance control application 153 may receive a configuration setting (e.g., user input) with a deviation set point 164 for surge deviation.

Process 700 may also include executing a first independent primary control loop to control the main process variable at the process set point by manipulating the variable guide vane position (block 730). For example, process controller 142 may execute performance control application 143 in a first independent primary control loop to control main process variable 156 at process set point 158 by manipulating the variable guide vane position (e.g., via inlet guide vanes position command 154).

Process 700 may further include executing a second independent primary control loop to control a surge deviation level at the deviation set point by manipulating a compressor speed set point (block 740), and executing a limit control loop to limit the main process variable at a limit set point by manipulating the compressor speed set point (block 750). For example, process controller 152 may execute performance control application 153 in a second independent primary control loop to control surge deviation level 162 at the deviation set point 164 by manipulating a compressor speed set point (e.g., via speed set point command 160). The surge deviation level 162 is calculated by an antisurge controller 112 from an antisurge control loop. Process controller 152 may also execute performance control application 153 in a limit control loop to limit main process variable 156 at limit set point 166 by manipulating the compressor speed set point. The limit set point 166 may be calculated by adding a positive or negative bias value 168 to process set point 158.

Figure 8:
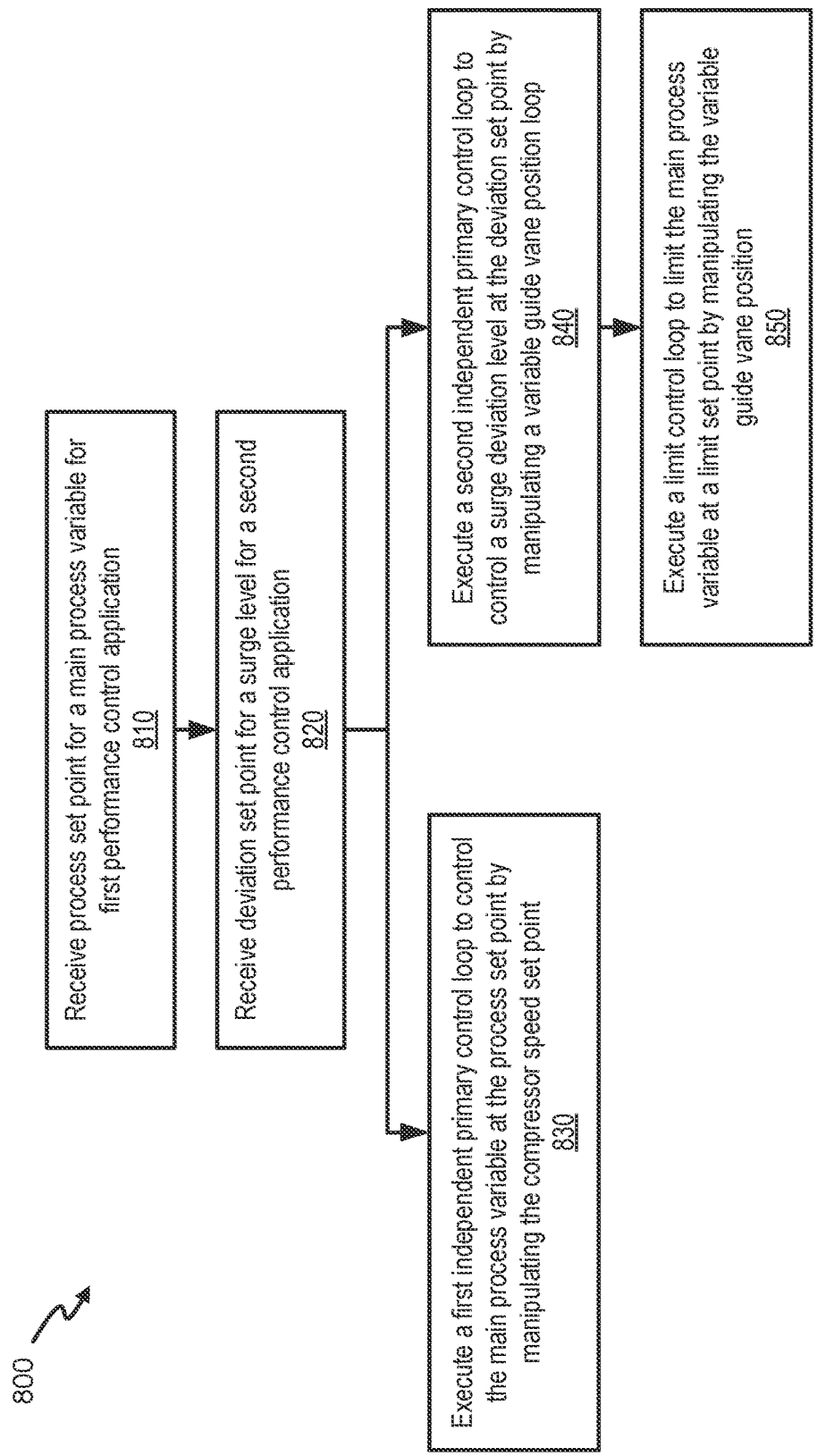
FIG. 8 is another process flow diagram for dynamically controlling both the speed set point and guide vane position to optimize operating conditions of a compressor, according to another implementation with the primary control variable controlled by shaft speed.

FIG. 8 is a flow diagram of another process 800 for dynamically controlling both the speed set point and guide vane position to optimize operating conditions of a compressor. According to one implementation, process 800 may be performed by performance control applications executed on process controllers 142 and process controllers 152. In another implementation, process 800 may be performed by one or more process controllers in conjunction with antisurge controller 112, speed valve controller 132, and field devices.

As shown in FIG. 8, process 800 may include receiving a process set point for a main process variable for first performance control application (block 810), and receiving a deviation set point for a surge level for a second performance control application (block 820). For example, according to the implementation of FIG. 2B, process controller 142 and/or performance control application 243 may receive a configuration setting (e.g., user input) with process set point 258 for a main process variable, such as an inlet flow rate or discharge pressure. Similarly, process controller 152 and/or performance control application 253 may receive a configuration setting (e.g., user input) with a deviation set point 264 for surge deviation.

Process 800 may also include executing a first independent primary control loop to control the main process variable at the process set point by manipulating the compressor speed set point (block 830). For example, process controller 152 may execute performance control application 253 in a first independent primary control loop to control main process variable 256 at process set point 258 by manipulating the compressor speed set point (e.g., via speed set point command 160).

Process 800 may further include executing a second independent primary control loop to control a surge deviation level at the deviation set point by manipulating a variable guide vane position (block 840), and executing a limit control loop to limit the main process variable at a limit set point by manipulating the variable guide vane position (block 850). For example, process controller 142 may execute performance control application 243 in a second independent primary control loop to control surge deviation level 262 at the deviation set point 264 by manipulating a variable guide vane position (e.g., via inlet guide vanes position command 154). The surge deviation level 262 is calculated by antisurge controller 112 from an antisurge control loop. Process controller 142 may also execute performance control application 243 in a limit control loop to limit main process variable 256 at limit set point 266 by manipulating the variable guide vane position. The limit set point 266 may be calculated by adding a positive or negative bias value 268 to process set point 258.

While some portions of the flow diagrams in FIGS. 7 and 8 are represented as a sequential series of blocks, in other implementations, different blocks may be performed in parallel or in series. For example, in one implementation, surge deviation control and limit control processes may be performed simultaneously or asynchronously.

FIG. 9 is a diagram illustrating exemplary physical components of a controller 900. Controller 900 may correspond, for example, to one of antisurge controller 112, speed valve controller 132, process controller 142, and/or process controller 152. Controller 900 may include a bus 910, a processor 920, a memory 930, an input component 940, an output component 950, and a communication interface 960.

Bus 910 may include a path that permits communication among the components of controller 900. Processor 920 may include a processor, a microprocessor, or processing logic that may interpret and execute instructions. Memory 930 may include any type of dynamic storage device that may store information and instructions (e.g., software 935), for execution by processor 920, and/or any type of non-volatile storage device that may store information for use by processor 920.

Software 935 includes an application or a program that provides a function and/or a process. Software 935 is also intended to include firmware, middleware, microcode, hardware description language (HDL), and/or other form of instruction. According to an implementation, software 935 may include, for example, one or more of performance control applications 143, 153, 243, or 253.

Input component 940 may include a mechanism that permits a user to input information to controller 900, such as a keyboard, a keypad, a button, a switch, a touch screen, etc. Output component 950 may include a mechanism that outputs information to the user, such as a display, a speaker, one or more light emitting diodes (LEDs), etc.

Communication interface 960 may include a transceiver that enables controller 900 to communicate with other devices and/or systems via wireless communications (e.g., radio frequency communications), wired communications, or a combination of wireless and wired communications. For example, communication interface 960 may include mechanisms for communicating with another device or system, such as suction pressure transmitter 120, suction temperature transmitter 122, discharge pressure transmitter 124, discharge temperature transmitter 126, or flow transmitter 128, via a network, or to other devices/systems, such as a system control computer that monitors operation of multiple systems 10 (e.g., in a steam plant or another type of plant). In one implementation, communication interface 960 may be a logical component that includes input and output ports, input and output systems, and/or other input and output components that facilitate the transmission of data to/from other devices.

Controller 900 may perform certain operations in response to processor 920 executing software instructions (e.g., software 935) contained in a computer-readable medium, such as memory 930. A computer-readable medium may be defined as a non-transitory memory device. A non-transitory memory device may include memory space within a single physical memory device or spread across multiple physical memory devices. The software instructions may be read into memory 930 from another computer-readable medium or from another device. The software instructions contained in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

Controller 900 may include fewer components, additional components, different components, and/or differently arranged components than those illustrated in FIG. 9. As an example, in some implementations, a display may not be included in controller 900. As another example, controller 900 may include one or more switch fabrics instead of, or in addition to, bus 910. Additionally, or alternatively, one or more components of controller 900 may perform one or more tasks described as being performed by one or more other components of controller 900.

According to systems and methods described herein, a control system is provided to optimize a compressor that has a variable guide vane position and a variable speed set point. One or more controllers receive a process set point for a main process variable for a first performance control application and a deviation set point for a surge level for a second performance control application. The first performance control application operates a first independent primary control loop to control the main process variable at the process set point by manipulating one of the variable guide vane position or the variable speed set point. The second performance control application operates a second independent primary control loop to control a surge deviation level at the deviation set point by manipulating the other of the variable speed set point or the variable guide vane position. The second performance control application also executes a limit control loop to limit the main process variable at a limit set point by manipulating the other of the variable speed set point or the variable guide vane position. The limit set point may be calculated at the process set point plus a bias value.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while a series of blocks have been described with regard to FIGS. 7 and 8, the order of the blocks and message/operation flows may be modified in other embodiments. Further, non-dependent blocks may be performed in parallel.

Although the invention has been described in detail above, it is expressly understood that it will be apparent to persons skilled in the relevant art that the invention may be modified without departing from the spirit of the invention. Various changes of form, design, or arrangement (e.g., use in capacity control, speed control, or other control applications) may be made to the invention without departing from the spirit and scope of the invention.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

Embodiments described herein may be implemented in many different forms of software executed by hardware. For example, a process or a function may be implemented as "logic," a "component," or an "element." The logic, the component, or the element, may include, for example, hardware (e.g., processor 920, etc.), or a combination of hardware and software (e.g., software 935). Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A control system for a compressor that has a variable guide vane position and a variable speed set point, the control system comprising:
   one or more memory devices for storing a first performance control application and a second performance control application;
   one or more communication interfaces for receiving data from one or more field devices associated with the compressor; and
   one or more processors configured to:
      execute the first performance control application in a first independent primary control loop to control a main process variable at a process set point by manipulating one of the variable guide vane position or the variable speed set point;
      execute the second performance control application in a second independent primary control loop to control a surge deviation level at a deviation set point by manipulating the other of the variable speed set point or the variable guide vane position, wherein the surge deviation level is calculated by an antisurge control loop; and
      execute the second performance control application in a limit control loop to limit the main process variable at a limit set point by manipulating the other of the variable speed set point or the variable guide vane position, wherein the limit set point is calculated at the process set point plus a bias value.

2. The control system of claim 1, wherein the one or more processors are further configured to:
   calculate, from the antisurge control loop, the surge deviation level; and
   forward the surge deviation level to the second control loop.

3. The control system of claim 1, wherein the one or more processors are further configured to:
   apply the variable speed set point to a speed control loop for the compressor.

4. The control system of claim 1, wherein the first independent primary control loop and the second independent primary control loop each include a control proportional-integral-derivative (PID) control.

5. The control system of claim 1, wherein the process set point includes one of a discharge flow rate, a discharge pressure, or a discharge temperature.

6. The control system of claim 1, wherein the one or more processors are further configured to:
receive as input the bias value, wherein the bias value is one of a positive value or a negative value.

7. The control system of claim 1, wherein the one or more field devices include a suction pressure transmitter, a suction temperature transmitter, a discharge pressure transmitter, a discharge temperature transmitter, or a flow transmitter.

8. The control system of claim 1, wherein the first performance control application and the second performance control application operate simultaneously.

9. The control system of claim 1, wherein the one or more processors are further configured to:
receive, as user input for the first performance control application, the main process variable, and
receive, as user input for the second performance control application, the deviation set point.

10. A method of controlling a compressor system having a variable guide vane position and a variable speed set point, the method comprising:
receiving, as first input to a controller, a process set point for a main process variable for a first performance control application;
receiving, as second input to the controller, a deviation set point for a surge deviation level for a second performance control application;
executing, by the controller, the first performance control application in a first independent primary control loop to control the main process variable at the process set point by manipulating one of the variable guide vane position or the variable speed set point;
executing, by the controller, the second performance control application in a second independent primary control loop to control the surge deviation level at the deviation set point by manipulating the other of the variable speed set point or the variable guide vane position, wherein the surge deviation level is calculated by an antisurge control loop; and
executing, by the controller, the second performance control application in a limit control loop to limit the main process variable at a limit set point by manipulating the other of the variable speed set point or the variable guide vane position, wherein the limit set point is calculated at the process set point plus a bias value.

11. The method of claim 10, further comprising:
calculating, from the antisurge control loop, the surge deviation level; and
forwarding the surge deviation level to the second control loop.

12. The method of claim 10, further comprising:
applying the variable speed set point to a speed control loop for the compressor.

13. The method of claim 10, wherein the first independent primary control loop and the second independent primary control loop each include a control proportional-integral-derivative (PID) control.

14. The method of claim 10, wherein the process set point includes one of a discharge flow rate, a discharge pressure, or a discharge temperature.

15. The method of claim 10, further comprising:
receiving, as input to the controller, the bias value, wherein the bias value is one of a positive value or a negative value.

16. The method of claim 10, further comprising:
receiving data from one or more field devices associated with the compressor system, wherein the one or more field devices include a suction pressure transmitter, a suction temperature transmitter, a discharge pressure transmitter, a discharge temperature transmitter, or a flow transmitter.

17. The method of claim 10, wherein the first performance control application and the second performance control application operate simultaneously.

18. A non-transitory computer-readable medium containing instructions executable by at least one processor of a controller for a compressor, the instructions configured for:
receiving, as first input, a process set point for a main process variable for a first performance control application;
receiving, as second input, a deviation set point for a surge deviation level for a second performance control application;
executing, by the controller, the first performance control application in a first independent primary control loop to control the main process variable at the process set point by manipulating one of a variable guide vane position or a variable speed set point;
executing, by the controller, the second performance control application in a second independent primary control loop to control the surge deviation level at the deviation set point by manipulating the other of the variable speed set point or the variable guide vane position, wherein the surge deviation level is calculated by an antisurge control loop; and
executing, by the controller, the second performance control application in a limit control loop to limit the main process variable at a limit set point by manipulating the other of the variable speed set point or the variable guide vane position, wherein the limit set point is calculated at the process set point plus a bias value.

19. The non-transitory computer-readable medium of claim 18, wherein the instructions are further configured for:
calculating, from the antisurge control loop, the surge deviation level; and
forwarding the surge deviation level to the second control loop.

20. The non-transitory computer-readable medium of claim 18, wherein the instructions are further configured for:
applying the variable speed set point to a speed control loop for the compressor.

* * * * *